US008923996B2

(12) United States Patent
Young et al.

(10) Patent No.: US 8,923,996 B2
(45) Date of Patent: Dec. 30, 2014

(54) HIGH DEFINITION AND HIGH RESOLUTION MUSIC AND/OR VIDEO APPLICATIONS AND METHODS OF USE THEREOF

(76) Inventors: Neil Young, Los Angeles, CA (US); Larry A. Johnson, Los Angeles, CA (US); Ben Johnson, legal representative, Altadena, CA (US)

( * ) Notice: Subject to any disclaimer, the term of this patent is extended or adjusted under 35 U.S.C. 154(b) by 574 days.

(21) Appl. No.: 12/690,801

(22) Filed: Jan. 20, 2010

(65) Prior Publication Data
US 2010/0324706 A1 Dec. 23, 2010

Related U.S. Application Data

(60) Provisional application No. 61/145,922, filed on Jan. 20, 2009.

(51) Int. Cl.
*G06F 17/00* (2006.01)
*H04N 21/81* (2011.01)
(Continued)

(52) U.S. Cl.
CPC .......... *H04H 20/95* (2013.01); *H04N 21/8193* (2013.01); *H04N 21/4402* (2013.01);
(Continued)

(58) Field of Classification Search
USPC .......................................................... 700/94
See application file for complete search history.

(56) References Cited

U.S. PATENT DOCUMENTS 6,332,175 B1 * 12/2001 Birrell et al. .................. 711/112
7,315,764 B1 * 1/2008 Sutardja et al. ................. 700/94
(Continued)

FOREIGN PATENT DOCUMENTS

EP 1672471 A1 6/2006

OTHER PUBLICATIONS

FLAC (Free Lossless Audio Codec), FLAC-Documentation, publicly available Dec. 28, 2007 as retrieved from the Internet Archive on Mar. 17, 2014.*

(Continued)

*Primary Examiner* — Andrew C Flanders
(74) *Attorney, Agent, or Firm* — Perkins Coie LLP

(57) ABSTRACT

A high-resolution music application is disclosed and comprises: a) a high resolution audio file, b) an executable application that is compatible with the high resolution audio file, and c) a device that contains both the high resolution audio file and the executable application, wherein the device comprises at least one speaker, at least one control system, at least one headphone or earbud port or a combination thereof. In addition, a high-resolution multi-media application is disclosed that comprises: a) at least one high resolution file, b) an executable application that is compatible with the at least one high resolution file, and c) a device that contains both the at least one high resolution audio file and the executable application, wherein the device comprises at least one speaker, at least one control system, at least one headphone or earbud port or a combination thereof. Contemplated methods of producing and operating a high-resolution music application comprises: a) providing a high-resolution audio file, b) providing an executable application that is compatible with the high-resolution audio file, and c) providing a hardware device that contains both the high-resolution audio file and the executable application, wherein the executable application identifies the format, transmits the file, stores the file or a combination thereof the high-resolution audio file and wherein the device comprises at least one speaker, at least one control system, at least one headphone or earbud port or a combination thereof. Also, contemplated methods of producing and operating a high-resolution multi-media application comprises: a) providing at least one high-resolution file, b) providing an executable application that is compatible with the at least one high resolution file, and c) providing a device that contains both the at least one high-resolution audio file and the executable application, wherein the executable application identifies the format, transmits the file, stores the file or a combination thereof the high-resolution file and wherein the device comprises at least one speaker, at least one control system, at least one headphone or earbud port or a combination thereof.

14 Claims, 1 Drawing Sheet

(51) Int. Cl.
*H04N 21/4402* (2011.01)
*H04N 21/41* (2011.01)
*H04N 21/439* (2011.01)
*H04H 20/95* (2008.01)

(52) U.S. Cl.
CPC ...... *H04N 21/8113* (2013.01); *H04N 21/4126* (2013.01); *H04N 21/4398* (2013.01)
USPC .......................................................... 700/94

(56) References Cited

U.S. PATENT DOCUMENTS

| | | | |
|---|---|---|---|
| 2004/0089346 A1* | 5/2004 | Sutardja | 137/377 |
| 2004/0143349 A1* | 7/2004 | Roberts et al. | 700/94 |
| 2005/0036628 A1* | 2/2005 | Devito | 381/61 |
| 2005/0053365 A1* | 3/2005 | Adams et al. | 386/125 |
| 2006/0095848 A1 | 5/2006 | Naik | |
| 2006/0294559 A1 | 12/2006 | Ansari | |
| 2007/0100485 A1* | 5/2007 | Teramachi et al. | 700/94 |
| 2008/0016534 A1 | 1/2008 | Ortiz | |
| 2008/0198275 A1* | 8/2008 | Kinouchi | 348/738 |
| 2009/0069915 A1* | 3/2009 | Khedouri et al. | 700/94 |

OTHER PUBLICATIONS

FLAC (Free Lossless Audio Codec), FLAC-FAQ, publicly available Dec. 28, 2007 as retrieved from the Internet Archive on Mar. 17, 2014.*

FLAC (Free Lossless Audio Codec), FLAC-Features, publicly available Dec. 28, 2007 as retrieved from the Internet Archive on Mar. 17, 2014.*

FLAC (Free Lossless Audio Codec), FLAC-Format, publicly available Dec. 28, 2007 as retrieved from the Internet Archive on Mar. 17, 2014.*

* cited by examiner

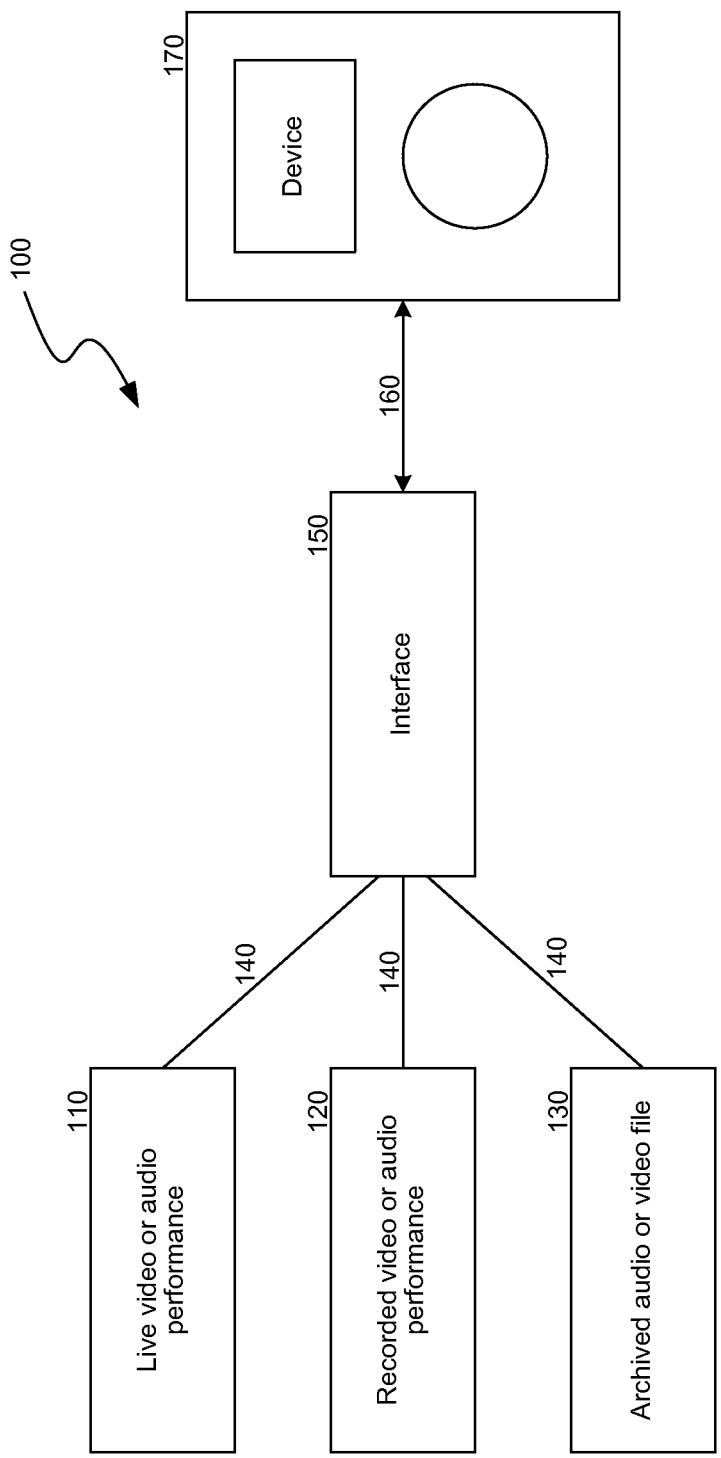

HIGH DEFINITION AND HIGH RESOLUTION MUSIC AND/OR VIDEO APPLICATIONS AND METHODS OF USE THEREOF

This United States Utility Application claims priority to U.S. Provisional Application Ser. No. 61/145922 filed on Jan. 20, 2009, which is incorporated herein in its entirety by reference.

FIELD OF THE SUBJECT MATTER

The field of the subject matter is a versatile high definition and/or high resolution music and/or video application, platform and uses thereof.

BACKGROUND

Music and video consumers, especially those who utilize portable audio and video devices, have learned to settle with the quality of music and video content. In some instances, audio and video quality is sacrificed in order to keep file sizes small and easily storable/transferable. In other instances, the initial quality of recordings is poor to begin with resulting in a low quality reproduction or download. In yet other instances, the hardware and software of portable devices are not adequate to allow the full sound and video components to come across to the listener.

High definition music and video should be recorded in the highest quality format available, regardless of the file size, and transmitted to users in that same quality format. Generally, music lovers purchase high end sound systems that can accommodate these large files and can reproduce the intricate sounds and phrasing that are never heard on lower end systems and portable players. Also, there are many systems that can accept high definition formats, but ultimately convert those files to a substandard format in order to transmit to the speakers and/or headphones and to deal with storage issues. For example, US 2008/0065768 discloses live streaming of high resolution video performances to a handheld device, but there is absolutely no disclosure regarding what happens to that performance once it reaches the handheld device. The disclosure focuses on the ability to view these performances from inside or outside of the venue, but there is no application that receives the high resolution video file and converts it so that it can be played in its original high resolution form on the handheld device with no loss of video or audio quality.

It would be ideal to develop an executable application, along with an interface system and the hardware and devices to support the executable application that would allow high resolution or high definition music, video and audio files to be played as recorded without a loss of audio and/or video quality.

SUMMARY

A high-resolution music application is disclosed and comprises: a) a high resolution audio file, b) an executable application that is compatible with the high resolution audio file, and c) a device that contains both the high resolution audio file and the executable application, wherein the device comprises at least one speaker, at least one control system, at least one headphone or earbud port or a combination thereof.

In addition, a high-resolution multi-media application is disclosed that comprises: a) at least one high resolution file, b) an executable application that is compatible with the at least one high resolution file, and c) a device that contains both the at least one high resolution audio file and the executable application, wherein the device comprises at least one speaker, at least one control system, at least one headphone or earbud port or a combination thereof.

Contemplated methods of producing and operating a high-resolution music application comprises: a) providing a high-resolution audio file, b) providing an executable application that is compatible with the high-resolution audio file, and c) providing a hardware device that contains both the high-resolution audio file and the executable application, wherein the executable application identifies the format, transmits the file, stores the file or a combination thereof the high-resolution audio file and wherein the device comprises at least one speaker, at least one control system, at least one headphone or earbud port or a combination thereof.

Also, contemplated methods of producing and operating a high-resolution multi-media application comprises: a) providing at least one high-resolution file, b) providing an executable application that is compatible with the at least one high resolution file, and c) providing a device that contains both the at least one high-resolution audio file and the executable application, wherein the executable application identifies the format, transmits the file, stores the file or a combination thereof the high-resolution file and wherein the device comprises at least one speaker, at least one control system, at least one headphone or earbud port or a combination thereof.

BRIEF DESCRIPTION OF THE FIGURES

FIG. 1 shows a schematic view of a contemplated high resolution multi-media application.

DETAILED DESCRIPTION

An ideal and contemplated system is one that is designed for the typical music lover—the one who wants his or her music anywhere, anytime and in its originally produced and/or recorded form and who may not have the resources to invest in an extensive system to play high resolution and/or high definition audio and/or video. To this end, an executable application and a related interface system, along with the hardware and devices to support that application, have been developed and are described herein that allows high resolution or high definition music, video and audio files to be played as recorded without a loss of quality compression or detrimental conversion.

Specifically, a high-resolution music application comprises: a) a high resolution audio file, b) an executable application that is compatible with the high resolution audio file, and c) a device that contains both the high resolution audio file and the executable application, wherein the device comprises at least one speaker, at least one control system, at least one headphone or earbud port or a combination thereof. Also, a high-resolution multi-media application comprises: a) at least one high resolution file, b) an executable application that is compatible with the at least one high resolution file, and c) a device that contains both the at least one high resolution audio file and the executable application. In these applications, the at least one high resolution file comprises an audio file, a video file, a multi-media file or a combination thereof, wherein the device comprises at least one speaker, at least one control system, at least one headphone or earbud port or a combination thereof.

FIG. 1 shows a schematic of a contemplated embodiment of a high-resolution or high definition multi-media application and system 100. In this embodiment, a high-resolution and/or high definition multi-media file (110, 120, 130) is forwarded to, loaded on to or downloaded on to 140 a suitable interface or interface system 150. A user (not shown) can utilize a suitable device 170 to access 160 the interface system 150 in order to identify the format of the file (110, 120, 130), download or transmit the file to the device 170 without compression or detrimental conversion.

As used herein, the phrase "compatible with" used with respect to phrases herein, such as "an executable application that is compatible with the high resolution audio file" or "an executable application that is compatible with the at least one high resolution file", means that the application can recognize the format of the at least one high resolution file regardless of its format and can transmit it or convert it, if needed, to be transmitted by the device or hardware. As will be mentioned later in the application, high resolution or high definition formats come in many forms, so contemplated applications will be able to recognize those formats and ensure that the file is suitable for transmission by the device in its original high definition or high resolution form without compression or detrimental conversion procedures.

Contemplated methods of producing and operating a high-resolution music application comprises: a) providing a high-resolution audio file, b) providing an executable application that is compatible with the high-resolution audio file, and c) providing a hardware device that contains both the high-resolution audio file and the executable application, wherein the executable application identifies the format, transmits the file, stores the file or a combination thereof the high-resolution audio file and wherein the device comprises at least one speaker, at least one control system, at least one headphone or earbud port or a combination thereof. Also, contemplated methods of producing and operating a high-resolution multimedia application comprises: a) providing at least one high-resolution file, b) providing an executable application that is compatible with the at least one high-resolution file, and c) providing a device that contains both the at least one high-resolution audio file and the executable application, wherein the executable application identifies the format, transmits the file, stores the file or a combination thereof the high-resolution file and wherein the device comprises at least one speaker, at least one control system, at least one headphone or earbud port or a combination thereof.

Contemplated high-resolution and/or high definition audio and/or video systems would be able to accommodate recorded studio or live music or video, live streaming music and/or video, archived studio or live music and/or video or a combination thereof in high definition formats, such as blu-ray format. This flexibility means that the music can be heard, in its original format, on any sound system, including a laptop computer, a Cloud™ player, an iPod™ system, an MP3 or MP4 system, a desktop computer, a handheld device, such as a Palm Pilot, Blackberry or cell phone, and other suitable portable or local systems without being detrimentally converted into another form, compressed or otherwise modified.

Additional systems can be designed for use in land, water and air transportation, such that the device is designed as part of the design of the vehicle or the device is designed to be readily incorporated into the transportation components, such as coupling with the cigarette lighter/power supply or another coupling port on the vehicle. Part of this flexibility, specifically, is that the user never has to provide any information to the device with respect to format. The device immediately recognizes the format, accepts the file size, and can open, play and save that file in its original and intended format.

Additionally, contemplated high-resolution and/or high definition applications and devices comprise the ability to transmit the sound from the file to the headphones or speakers of the device. In these embodiments, the device will allow for instant high definition and/or high-resolution playback through the headphones or speakers automatically. In many instances, ideal devices will convert the signal from digital to analog in order to play through the headphones.

In addition to the contemplated system described above, users also want the ability to edit video and music files within the file, such that songs, musical segments/sets, videos, etc can be extracted from live performances or recorded segments and edited within the song.

In order to achieve these ideal results, an application should be developed that can allow a user edit audio/video files within the file, allow instant format recognition by the device, and allows the user to hear the high definition sound through speakers and/or headphones. This application or "app. file" can be loaded onto, downloaded onto or provided initially with any suitable device, such as those mentioned earlier. In some embodiments, the executable application executes the high-resolution file in the device by a) identifying a high-resolution or high definition file, b) recognizing the format of the file, c) optionally downloading or storing the file on a network or on the device, d) opening the file, and e) transmitting the content of the file to the user or listener through at least one speaker, at least one headphone, at least one earbud or another suitable listening device in order that the user may listen to the content of the file as it was originally recorded or transmitted. In other embodiments, the term "executes" comprises playing the content of the high-resolution file on the device for the user and/or listener to hear, as it was originally recorded and/or transmitted.

Also, devices that are able to run these contemplated applications or app. files are contemplated herein, especially those devices that have wireless capability and allow immediate transmissions of live events to be played on the device, as the event is happening.

It is contemplated that the user will be able to view playlists and content directly on a portable device or through the use of an interface system, such as a network, iTunes, Yahoo Music or another suitable Internet-based interface system. The user can utilize this interface system, which is connected in some way to a server, server farm or network, to subscribe to and download other music/videos. Content may also be purchased or downloaded through other sites and included on a contemplated device. For example, high definition compilations, such as the Neil Young compilation/archive project, may be downloaded into these devices and played back using high-resolution and/or high definition audio and video.

EXAMPLES

Example 1

Live Plus Download Updates from Artists

A contemplated user may subscribe to all live events available from Neil Young as they become available. During the recording of Neil Young's new album, he sets up cameras and additional sound transmission/recording devices in the recording studio that will allow live sessions of the recording to be streamed in real-time to subscribers in high definition and/or high resolution formats. If the user subscribes to "live feed only"—then the transmission is not downloaded or otherwise saved on the user's device/player in high definition and/or high-resolution format that is not and does not need to be compressed. If the user subscribes to "live feed plus download", then the transmission is downloaded—in the original format—to the user's device or device interface either during or after the live feed is transmitted. If the user enjoys a certain segment of the recording, the user can edit the file to remove other portions of the recording and save the modified recording in its original high definition and/or high-resolution uncompressed format. Unlike other conventional devices, the user can edit recordings on the portable device directly, along with editing the recordings on a desktop (non-portable) or computer-based device.

Example 2

Live Plus Download Updates from Sporting Events

In another embodiment, a high school subscribes to "live feed plus download" for NCAA Men's Basketball games. The men's basketball team at the high school has a video coordinator/coach who reviews the games as a live feed when they come into the system on a portable device. The coach then edits out certain portions that may be considered "teaching moments" of these games and forwards them out to the guards on the team for review on their portable devices by utilizing the application. These edited versions would be presented to the users in the same high definition and/or high-resolution uncompressed format as they were originally recorded and/or transmitted, along with being available to be heard in high definition and/or high-resolution uncompressed format through speakers and/or headphones without input from the user.

Thus, specific embodiments and applications of a high definition and/or high-resolution music, audio and video platform have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A high-resolution music system, comprising:
a high-resolution audio or video file in its original format, an executable application that is compatible with the high-resolution audio or video file, and
a handheld device that has stored on it both the high-resolution audio or video file and the executable application, wherein the device comprises at least one speaker, at least one control system, at least one headphone or earbud port or a combination thereof;
wherein the application is configured to:
a) permit a user to subscribe to live events available from an artist,
wherein the subscription includes—
a live feed only option that provides transmission but not download for storage on the handheld device of high-resolution audio or video files, and
a live feed plus download option that provides transmission and download for storage on the handheld device high-resolution audio or video files, and
b) permit the user to subscribe to a live feed with download and edit, which provides transmission and download for storage on the handheld device high-resolution audio or video files, and
wherein the user can review the audio or video files when they come into the handheld device, edit out certain portions, and forward the edited portions to other users to view or listen to on the other users' portable devices.

2. The high-resolution music application of claim 1, wherein the high-resolution file is uncompressed.

3. The high-resolution music application of claim 1, wherein the executable application executes the high-resolution file in the device.

4. The high-resolution music application of claim 3, wherein executes comprises playing the content of the high-resolution file on the device.

5. The high-resolution music application of claim 1, wherein the handheld device comprises a sound system, a laptop computer, an MP3 or MP4 system, a cell phone or a combination thereof 6. The high-resolution music application of claim 1, wherein the executable application can transmit the high-resolution file to the speaker, the headphones, the earbud port or a combination thereof.

7. The high-resolution music application of claim 1, wherein the control system comprises a power switch, a volume control, a menu control, a forward control, a skip control, a back control or a combination thereof.

8. A high-resolution multi-media application, comprising:
at least one high-resolution file, in its original format an executable application that is compatible with the at least one high resolution file, and
a handheld device that has stored on it both the at least one high-resolution audio file and the executable application, wherein the device comprises at least one speaker, at least one control system, at least one headphone or earbud port or a combination thereof 9. The high-resolution multi-media application of claim 8, wherein the at least one high-resolution file comprises an audio file, a video file, a multi-media file or a combination thereof 10. A method of producing and operating a high-resolution multi-media application, comprising:
providing at least one high-resolution file in its original format,
providing an executable application that is compatible with the at least one high resolution file, and
providing a handheld device that has stored on it both the at least one high-resolution audio file and the executable application, wherein the executable application identifies the format, transmits the file, stores the file or a combination thereof the high-resolution file in its original format and wherein the device comprises at least one speaker, at least one control system, at least one headphone or earbud port or a combination thereof, and
wherein the method further comprises:
a) permitting a user to subscribe to live events available from an artist,
wherein the subscription includes—
a live feed only option that provides transmission but not download for storage on the handheld device of high-resolution audio or video files, and
a live feed plus download option that provides transmission and download for storage on the handheld device high-resolution audio or video files, and b) permitting the user to subscribe to a live feed with download and edit, which provides transmission and download for storage on the handheld device high-resolution audio or video files, and
   wherein the user can review the audio or video files when they come into the handheld device, edit out certain portions, and forward the edited portions to other users to view or listen to on the other users' portable devices.

11. The method of claim 10, wherein the high-resolution file is uncompressed.

12. The method of claim 10, wherein the handheld device comprises a sound system, a laptop computer, an MP3 or MP4 system, a cell phone or a combination thereof 13. The method of claim 10, wherein the executable application can transmit the high-resolution file to the speaker, the headphones, the earbud port or a combination thereof 14. The method of claim 10, wherein the control system comprises a power switch, a volume control, a menu control, a forward control, a skip control, a back control or a combination thereof.

\* \* \* \* \*

UNITED STATES PATENT AND TRADEMARK OFFICE
CERTIFICATE OF CORRECTION

PATENT NO.         : 8,923,996 B2                                      Page 1 of 1
APPLICATION NO.    : 12/690801
DATED              : December 30, 2014
INVENTOR(S)        : Young et al.

It is certified that error appears in the above-identified patent and that said Letters Patent is hereby corrected as shown below:

In the Drawings

Drawing sheet 1 of 1, At the Bottom, below Figure insert -- FIG. 1 --.

In the Claims

Column 6, line 20, claim 5, delete "thereof" and insert -- thereof. --, therefor.

Column 6, line 37, claim 8, delete "thereof" and insert -- thereof. --, therefor.

Column 6, line 41, claim 9, delete "thereof" and insert -- thereof. --, therefor.

Column 6, line 52, claim 10, delete "thereof" and insert -- thereof, --, therefor.

Column 7, line 14, claim 12, delete "thereof" and insert -- thereof. --, therefor.

Column 7, line 17, claim 13, delete "thereof" and insert -- thereof. --, therefor.

Signed and Sealed this
Twenty-sixth Day of May, 2015

Michelle K. Lee
*Director of the United States Patent and Trademark Office*